US008635079B2

(12) United States Patent
McDougal et al.

(10) Patent No.: US 8,635,079 B2
(45) Date of Patent: *Jan. 21, 2014

(54) SYSTEM AND METHOD FOR SHARING MALWARE ANALYSIS RESULTS

(75) Inventors: Monty D. McDougal, St. Paul, TX (US); William E. Sterns, Dallas, TX (US); Randy S. Jennings, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,503

(22) Filed: Jun. 27, 2011

(65) Prior Publication Data

US 2012/0330863 A1    Dec. 27, 2012

(51) Int. Cl.
*G06Q 10/00* (2012.01)
*G06F 17/00* (2006.01)
*G06G 7/00* (2006.01)

(52) U.S. Cl.
USPC ........................... 705/1.1; 705/7.11; 705/400

(58) Field of Classification Search
USPC .............. 705/400, 7.35, 1.1, 7.11–7.42, 300, 705/325; 713/200
See application file for complete search history.

(56) References Cited

U.S. PATENT DOCUMENTS

| 7,640,589 | B1 | 12/2009 | Mashevsky et al. |
| 8,065,179 | B1* | 11/2011 | Karnik ......................... 705/7.35 |
| 8,286,241 | B1 | 10/2012 | Yeo et al. |
| 2003/0023866 | A1* | 1/2003 | Hinchliffe et al. ............ 713/200 |
| 2004/0073810 | A1 | 4/2004 | Dettinger et al. |
| 2005/0132184 | A1* | 6/2005 | Palliyil et al. ................. 713/152 |
| 2006/0230452 | A1 | 10/2006 | Field |
| 2007/0028291 | A1 | 2/2007 | Brennan et al. |
| 2007/0150957 | A1 | 6/2007 | Hartrell et al. |
| 2007/0162975 | A1 | 7/2007 | Overton et al. |
| 2008/0109871 | A1 | 5/2008 | Jacobs |
| 2009/0083852 | A1 | 3/2009 | Kuo et al. |
| 2009/0138573 | A1 | 5/2009 | Campbell et al. |
| 2010/0077481 | A1 | 3/2010 | Polyakov et al. |
| 2010/0114714 | A1* | 5/2010 | Vitek ......................... 705/14.69 |
| 2010/0169972 | A1 | 7/2010 | Kuo et al. |
| 2010/0192222 | A1 | 7/2010 | Stokes et al. |

(Continued)

OTHER PUBLICATIONS

Trend Micro, http://web.archive.org/web/20100507053309/http://housecall.trendmicro.com/apac/?, May 7, 2010, retrieved Feb. 14, 2013.*

(Continued)

*Primary Examiner* — George Chen
(74) *Attorney, Agent, or Firm* — Schwegman, Lundberg & Woessner, P.A.

(57) ABSTRACT

In certain embodiments, a computer-implemented method includes accessing information related to a first file determined to satisfy at least one of a plurality of suspected malware conditions. A first of a number of manager consoles may access the information, each manager console being communicatively coupled to a respective network of a number of networks. A request may be generated for a determination of whether the first file comprises malware. The determination may be conducted at a master manager console. Data may be accessed indicating a result, outputted by the master manager console, of the determination of whether the first file comprises malware. A sharing policy may be accessed and used to determine whether the result is sharable with a second one of the manager consoles. If the result is sharable, a message comprising the result may be generated to be sent to the second manager console.

20 Claims, 2 Drawing Sheets

(56) References Cited

U.S. PATENT DOCUMENTS

2010/0281248 A1   11/2010   Lockhart et al.
2011/0047620 A1   2/2011    Mahaffey et al.
2012/0266245 A1   10/2012   McDougal et al.
2012/0330801 A1   12/2012   Mcdougal et al.

OTHER PUBLICATIONS

McDougal et al., "Multi-Nodal Malware Analysis," U.S. Appl. No. 13/087,447, filed Apr. 15, 2011, 35 pages, (1389).

McDougal et al., "Distributed Malware Detection," U.S. Appl. No. 13/169,574, filed Jun. 27, 2011, 32 pages, (1391).

"U.S. Appl. No. 13/087,447, Final Office Action mailed Jun. 17, 2013", 24 pgs.

"U.S. Appl. No. 13/087,447, Non Final Office Action mailed Jan. 16, 2013", 20 pgs.

"U.S. Appl. No. 13/087,447, Response filed Apr. 16, 2013 to Non Final Office Action mailed Jan. 16, 2013", 13 pgs.

"U.S. Appl. No. 13/169,574, Non Final Office Action mailed Mar. 28, 2013", 10 pgs.

"U.S. Appl. No. 13/169,574, Response Filed Jan. 3, 2013 to Restriction Requirement mailed Dec. 20, 2012", 7 pgs.

"U.S. Appl. No. 13/169,574, Restriction Requirement mailed Dec. 20, 2012", 6 pgs.

"System and Method for Sharing Malware Analysis Results", U.S. Appl. No. 13/169,503, (Jun. 27, 2011), 33 pgs.

McDougal, et al., "Multi-Nodal Malware Analysis", U.S. Appl. No. 13/087,447, (Apr. 15, 2011), 35 pgs.

\* cited by examiner

SYSTEM AND METHOD FOR SHARING MALWARE ANALYSIS RESULTS

BACKGROUND

Malware (such as viruses, trojans, and other malicious software) has become increasingly difficult to protect against. Various methods have been used to combat malware, but more sophisticated malware continues to abound. Methods of detection have grown more complex but often these take longer to execute as a result of this complexity. Current, host-level malware protection systems search for files these systems can detect as being malware. However, malware protection limited to host systems is susceptible to numerous types of attacks. For example, zero-day attacks remain particularly problematic.

SUMMARY

According to one embodiment, a computer-implemented method includes: accessing information related to a first file determined to satisfy at least one of a plurality of suspected malware conditions. The information may be accessed by a first manager console of a plurality of manager consoles. Each manager console may be communicatively coupled to a respective network of a plurality of networks. Further, the method includes: generating a request for a determination of whether the first file comprises malware. The determination may be conducted at a master manager console configured to access requests generated from each of the plurality of manager consoles. Further, the method includes: accessing data indicating a result of the determination of whether the first file comprises malware. The result may be outputted by the master manager console. Further, the method includes: accessing a sharing policy associated with the first manager console and determining whether the sharing policy indicates that the result is sharable with a second manager console of the plurality of manager consoles. The method may further include, if the sharing policy indicates that the result is sharable with the second manager console, generating a message to be sent to the second manager console, the message comprising the result of the determination of whether the first file comprises malware.

Depending on the specific features implemented, particular embodiments may exhibit some, none, or all of the following technical advantages. In certain embodiments, multiple nodes of various networks may be capable of utilizing malware analysis services provided at a master manager console. In addition, particular networks may be capable of establishing respective sharing policies that determine the information those networks are willing to share with other networks (e.g., through the master manager console). In certain embodiments, the sharing policies of various networks may be used to split between those networks the cost of performing malware analysis at the master manager console. In certain instances, costs may be apportioned between networks without revealing to any one network the identity of the other networks also billed for at least a portion of that particular malware analysis. Particular systems may be operable to minimize inefficiencies associated with "false positive" malware detections. Various systems may be capable of minimizing the malware processing load at an analysis console. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
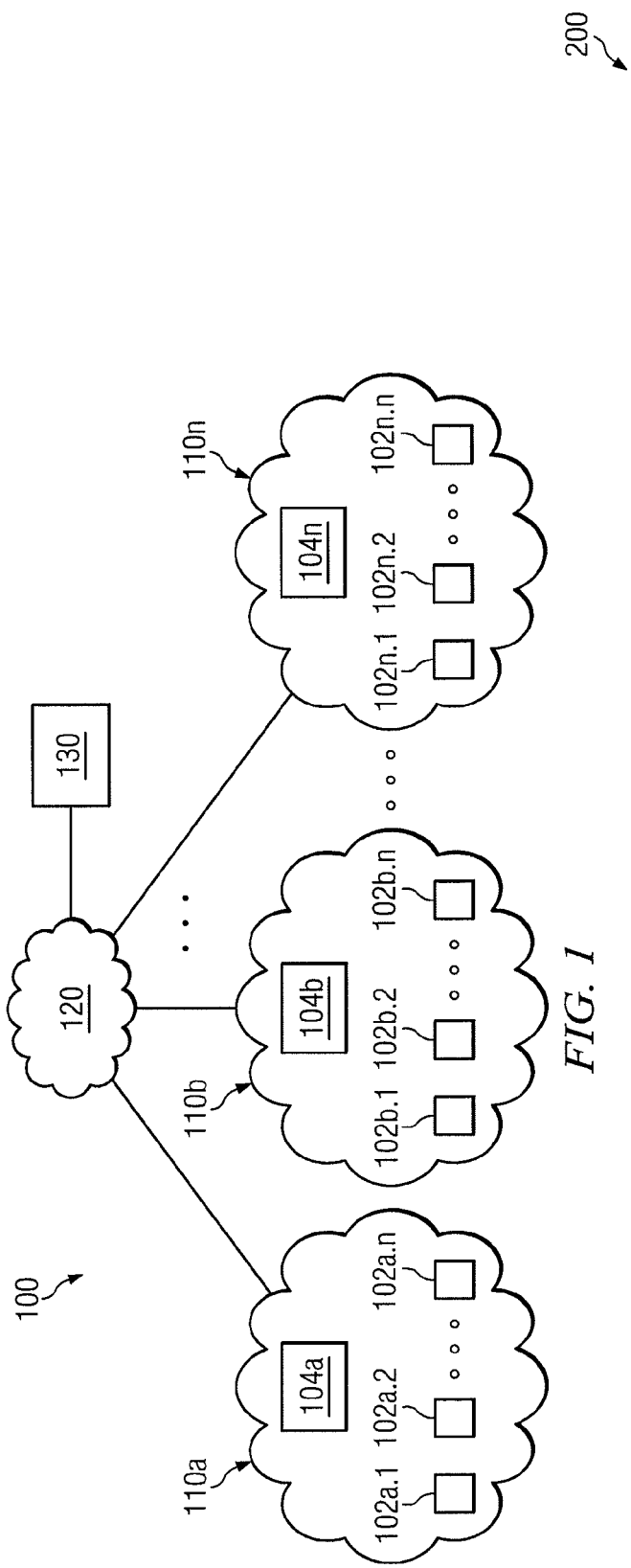
FIG. 1 is a block diagram illustrating one embodiment of a system for distributed malware analysis.

FIG. 1 is a block diagram illustrating one embodiment of a system 100 for managing the sharing of malware analysis results between networks. System 100 includes multiple networks 110 that are each communicatively coupled through a network 120 to a master manager console 130. Each network 110 includes a respective plurality of malware detection nodes 102 and a respective manager console 104. In particular embodiments, the malware detection nodes 102 and the manager console 104 of a particular network 110 (e.g., network 110a) may communicate with each other using that network 110 (e.g., network 110a). Certain manager consoles 104 may be capable of communicating with master manager console 130 using network 120. As described further below, master manager console 130 may be capable of processing malware analysis requests from each network 110. In certain embodiments, master manager console 130 is configured to determine whether to share with one or more other networks 110 (e.g., network 110b) the result of a particular malware analysis requested by another network 110 (e.g., network 110a). The determination of whether to share the result may be based at least in part on one or more sharing policies of networks 110. Accordingly, certain networks 110 may be given the option of controlling what, and with which other network(s) 110, particular items of information are shared.

In certain embodiments, each network 110 may be associated with a respective organization. For example, each network 110 may be associated with a respective company. As another example, one network 110 may be associated with one government agency and another network 110 may be associated with another government agency. As another example, one network 110 may be associated with a governmental agency and another network 110 may be associated with a company. In certain instances, direct communication between particular networks 110 may not be possible by design, though those networks 110 may have respective sharing policies that permit the sharing of information between or among those networks 110 via network 120 and/or master manager console 130.

Nodes 102, manager consoles 104, and master manager console 130 may be implemented using any suitable combination of hardware, firmware, or software. The nodes 102 and/or manager console 104 of a particular network 110 may be implemented on the same or different hardware in various suitable combinations. Further details regarding the implementation and/or operation of networks 110 and master manager console 130 are described below with reference to FIGS. 2-4.

In certain instances, master manager console 130 may identify a file as containing malware if it includes any of a variety of forms of hostile or intrusive computer-readable logic designed to infiltrate a computer system. Particular forms of malware may include computer viruses, worms, trojan horses, spyware, adware, crimeware, and other malicious and unwanted software. For purposes of this disclosure, a file may include one or more of the following in any suitable combination: (1) a data file; (2) a data record; (3) an email message; (4) an attachment to an email message; (5) a Uniform Resource Locator (URL) or other suitable address identifier; (6) text indicators; (7) malware analysis; and (8) any other suitable target object for which malware detection may be appropriate. In some embodiments, the term file as used herein may refer to a collection of files. For example, a ZIP file or other archive or compressed file type may include multiple embedded files.

Malware detection nodes 102, in certain embodiments, are each operable to determine whether a file is suspected of comprising malware. In certain embodiments, a particular node 102 may be capable of generating information that may be used in determining whether a file comprises malware. For example, the information may correspond to one or more files subjected to a set of malware detection processes run by that particular node 102. The node 102 may determine, based on a result of those malware detection processes, that a file analyzed at that node 102 is suspected of containing malware. Accordingly, the node 102 may submit a request for further malware analysis of that file suspected of containing malware. In certain instances, the request may include the file itself and/or may include information pertaining to that file. In a particular embodiment, the request may be communicated to master manager console 130 via the manager console 104 in communication with that node 102. Particular nodes 102 may be located remote from manager console 104 and/or master manager console 130.

Each node 102 may comprise one or more processing systems at one or more locations. As examples and not by way of limitation, a particular node 102 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, another type of host, or a combination of two or more of these. Where appropriate, nodes 102 may include one or more computer systems; be unitary or distributed; span multiple locations; span multiple machines; or reside in a cloud, which may include one or more cloud components in one or more networks. Where appropriate, one or more nodes 102 may perform without substantial spatial or temporal limitation one or more steps of one or more methods described or illustrated herein. As an example and not by way of limitation, one or more nodes 102 may perform in real time or in batch mode one or more steps of one or more methods described or illustrated herein. One or more nodes 102 may perform at different times or at different locations one or more steps of one or more methods described or illustrated herein, where appropriate. One or more processors of particular nodes 102 may include hardware for executing instructions, such as those making up a computer program.

Each management console 104, in various embodiments, is operable to manage the communication of malware analysis requests submitted by its respective network 110 to master management console 130. For example, a particular manager console 104 may determine that multiple requests correspond to identical or substantially identical files. Accordingly, the manager console 104 may submit only one request to master manager console 130 that is representative of all the identical or substantially identical requests received at the manager console 104. In certain embodiments, each manager console 104 is configured as a firewall for the respective network 110 to which that manager console 104 is communicatively coupled. Certain manager consoles 104 may be located remote from master manager console 130 and/or from each other manager console 104.

Certain manager consoles 104 may comprise one or more processing systems at one or more locations. As example and not by way of limitation, certain manager consoles 104 may each be an embedded computer system, an SOC, an SBC (e.g., a COM or SOM), a desktop computer system, a laptop or notebook computer system, an interactive kiosk, a mainframe, a mesh of computer systems, a mobile telephone, a PDA, a server, another type of host, or a combination of two or more of these. Where appropriate, certain manager consoles 140 may each include one or more computer systems; be unitary or distributed; span multiple locations; span multiple machines; or reside in a cloud, which may include one or more cloud components in one or more networks. Where appropriate, certain manager consoles 104 may each perform without substantial spatial or temporal limitation one or more steps of one or more methods described or illustrated herein. As an example and not by way of limitation, each manager console 104 may perform in real time or in batch mode one or more steps of one or more methods described or illustrated herein. Each manager console 104 may perform at different times or at different locations one or more steps of one or more methods described or illustrated herein, where appropriate. In particular embodiments, each manager console 104 may include one or more processors each having hardware for executing instructions, such as those making up a computer program.

In certain embodiments, master manager console 130 may be operable to access malware analysis requests, to facilitate the processing of malware analysis requests, and to facilitate the propagation of information according to one or more sharing policies. For example, master manager console 130 may access and process requests submitted by nodes 102, manager consoles 104, peer master manager consoles 130, and/or by any suitable node capable of submitting a request and providing a sharing policy associated with that request. The information propagated by master manager console 130 may include malware analysis outputs generated by master manager console 130. In certain instances, the information may be returned only to the manager console 104 that had submitted a corresponding request, based at least in part on the sharing policy of the network 110 where that manager console 104 resides. Alternatively, the information may be communicated not only to the requesting manager console 104, but also to the manager consoles 104 of other networks 110, based at least in part on the sharing policy of the network 110 where that requesting manager console 104 resides. In still other embodiments, master manager console 104 may push malware analysis results to one or more other components of system 100 (e.g., to one or more manager consoles 104 and or nodes 102), regardless of whether or not the malware analysis had been requested by those components. In this manner, certain networks 110 may benefit from the results of malware analysis performed by and/or on behalf of other networks 110. In addition, the information propagated to networks 110 by master manager console 130 may include one or more updates generated by maser manager console 104. In certain instances, the networks 110 receiving these updates may be operable to use these updates in implementing various malware detection processes. Certain networks 110 may have respective sharing policies that control the type of information corresponding to those networks 110 that master manager console 130 may share with certain other networks 110, as explained further below.

Master manager console 130 may comprise one or more processing systems at one or more locations. As example and not by way of limitation, analysis console 104 may be an embedded computer system, an SOC, an SBC (e.g., a COM or SOM), a desktop computer system, a laptop or notebook computer system, an interactive kiosk, a mainframe, a mesh of computer systems, a mobile telephone, a PDA, a server, another type of host, or a combination of two or more of these. Where appropriate, master manager console 130 may include one or more computer systems; be unitary or distributed; span multiple locations; span multiple machines; or reside in a cloud, which may include one or more cloud components in one or more networks. Where appropriate, master manager console 130 may perform without substantial spatial or temporal limitation one or more steps of one or more methods described or illustrated herein. As an example and not by way of limitation, master manager console 130 may perform in real time or in batch mode one or more steps of one or more methods described or illustrated herein. Master manager console 130 may perform at different times or at different locations one or more steps of one or more methods described or illustrated herein, where appropriate. In particular embodiments, manager console 130 may include one or more processors each having hardware for executing instructions, such as those making up a computer program. One example of the internal components that may be included in a master manager console 300 is described further below with reference to FIG. 3.

Networks 110 and/or 120 may include platforms operable to exchange data or information. In various embodiments, networks 110 and/or 120 may include one or more packet data networks offering communication interfaces or exchanges between components of system 100. Networks 110 and/or 120 may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks 110 and/or 120 may also include wireless technology such as WiMAX, LTE, or any of a variety of cellular data networks. In various embodiments, certain networks 110 and/or 120 may include firewalls or other equipment or software that create security zones and/or secure networks such as DMZs. One or more of nodes 102 and/or the manager console 104 of particular networks 110 may be located in one more of such security zones and/or secure networks in some embodiments. For example, the manager console 104 of a particular network 110 may be in a DMZ that is separate from one or more nodes 102 of that network 110. As another example, one node 102 of a particular network 110 may be in a different security zone than another node 102 of that network 110.

In operation of an example embodiment of system 100, a first node 102 may access a first file (or a set of files) and run a set of malware detection processes using the accessed first file (or files). One possible result of the malware detection processes may be a determination by the first node 102 that the first file satisfies one or more of a plurality of suspected malware conditions and should be analyzed further for malware. In response to this determination, the first node 102 may generate information related to the first file for use in a second stage of malware analysis.

In certain instances, the processing performed by the first node 102 may be considered the first stage of a multi-stage malware analysis. Subsequent processing performed at master manager console 130 may be considered a second stage of the multi-stage malware analysis. Alternatively, if a manager console 104 also processes one of the stages of malware analysis, then the processing performed at the manager console 104 and at master manager console 130 may be considered the second and third stages, respectively, of a multi-stage malware analysis.

In certain embodiments, a first manager console 104 may access the information generated by first node 102 that ran the set of malware detection processes using the accessed first file (or files). The first manager console 104 may, in certain instances, form a portion of the same network 110 as the node 102 that had accessed the first file (or files). The first manager console 104 may generate a request for a determination of whether the first file (or files) comprises malware. The first manager console 104 may communicate the request to master manager console 130 via network 120.

In particular embodiments, master manager console 130 may access the malware analysis request submitted by the first manager console 104. A malware analysis is processed at master manager console 130, which in certain instances may include processing input entered by a human review of that first file (or files) and/or its corresponding information. As a result of the malware analysis processed at master manager console 130, an output may be generated by master manager console 130. The output may include, for example, an indication of whether the first file (or files) is known to be malware. In addition, the output may include an identifier for the first file (or files). In certain instances, the output generated by master manager console 130 may include one or more updates, which may be used by manager consoles 104 in implementing various malware detection processes. The master manager console 130 may access an address for the manager console 104 that had requested the malware analysis for that first file (or files). The analysis console 104 sends the output in a communication addressed to that first manager console 104 and/or to the node 102 that had instigated the analysis. That first manager console 104 may propagate all or a portion of that output to the nodes 102 residing on the same network 110 as that first manager console 104. Alternatively, that first manager console 104 may propagate all or a portion of the output to the node 102 instigating the analysis and, based on a sharing policy of that node 102, to certain other nodes 102 residing on the same network 110 as that first manager console. Thus, a node 102 of a particular network 110 may have a sharing policy that dictates what information can be shared with certain other nodes 102 of the same network 110. Certain networks 110 may be subdivided into sub-networks, each including a respective subset of nodes 102. The nodes 102 grouped into a sub-network may each have a sharing policy that allows its corresponding manager console 104 to share malware analysis results with the other nodes 102 of the same sub-network, but may prohibit the manager console 104 from sharing malware analysis results with the nodes 102 of the same network 100 that are grouped into other sub-networks.

In certain embodiments, the output may also be shared with one or more manager consoles 104 other than the first manager console 104 according to a sharing policy of the first manager console 104, which had requested the malware analysis of the first file (or files). For example, in certain embodiments, master manager console 130 may access a sharing policy associated with the network 110 where the requesting first manager console 104 resides. Based at least in part on that accessed sharing policy, in certain instances, master manager console 130 may determine that the output it had generated may be communicated not only to the requesting first manager console 104, but also to one or more particular manager consoles 104 of other networks 110. If the sharing policy indicates that the output is sharable with one or more manager consoles 104 other than the first manager console 104, master manager console 130 may generate a message to be sent to those other manager console(s) 104. The message may comprise the output generated by master manger console 130 that indicates whether the first file (or files) is known to be malware. In this manner, certain networks 110 may benefit from the results of malware analysis performed by and/or on behalf of other networks 110. Each manager console 104 receiving the output may update a respective stored set of identifiers of files known to be malware or a respective stored set of identifiers known not to be malware, based on the indication of the output generated by master manager console 130 regarding whether the first file is malware.

Although the above example illustrates how the master manager console 130 may determine whether the output it generates may be shared, in certain alternative embodiments the first manager console 104 that had requested the analysis to be performed may determine whether the output may be shared. For example, the first manger console 104 may access its own sharing policy. If the sharing policy indicates that the result is sharable with one or more manager consoles 104, manager console 104 may generate a message to be sent to those other manager console(s) 104. The message may comprise the output generated by master manger console 130 that indicates whether the first file (or files) is known to be malware. Each manager console 104 receiving the output may update a respective stored set of identifiers of files known to be malware or a respective stored set of identifiers known not to be malware, based on the indication of the output generated by master manager console 130 regarding whether the first file is malware. As another example, the first manager console 104 may access a sharing policy of a node 102 that had instigated the malware analysis. If the sharing policy of that node indicates that the result is sharable with one or more other nodes 102 of the same network, the first manager console 104 may generate a message to be sent to those other nodes. The message may comprise the output generated by master manger console 130 that indicates whether the first file (or files) is known to be malware.

In particular embodiments a sharing policy may be accessed by analyzing information included with a request for the first file (or files) to be analyzed. For example, a tag may be included with information that indicates whether the output generated by master manger console 130 is sharable and with which network(s) 110 that output may be shared. In certain embodiments, using tags in this manner may enable a particular network 110 to adapt its sharing policy as desired on a file-by-file or record-by-record basis.

The operation described above illustrates one example of how networks 110 and master manager console 130 may operate cooperatively with each other to facilitate malware analysis. In certain instances, the malware analysis processes conducted at master manager console 130 may be provided as a service to multiple entities. A fee may be associated with that service. For example, fees may be determined on the basis of a subscription or a pay-per-service basis. If the output of a particular analysis conducted at master manager console 130 is shared among multiple networks 110, for example, the fee associated with that analysis may be apportioned among those networks 110 in a manner determined by master manager console 130.

In certain instances, system 100 may be operable to minimize inefficiencies associated with "false positive" malware detections by nodes 102. For example, a particular file might test positive for malware as a result of a set of malware detection processes run at a particular node 102, but then further analysis at master manager console 130 may result in a final adjudication that the file is known not to be malware. Because the results of the final adjudication may, in certain instances, be shared with other networks 110 via their respective manager consoles 104, the nodes 102 of those networks 110 receiving the output may later process similar malware detections using this final adjudication, without necessarily requesting further analysis to be performed at master manager console 130. Such a scenario illustrates one way in which the processing load at master manager console and associated costs, if any, may be minimized.

In particular embodiments, one or more nodes 102, manager consoles 104, and/or master manager console 130 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Figure 2:
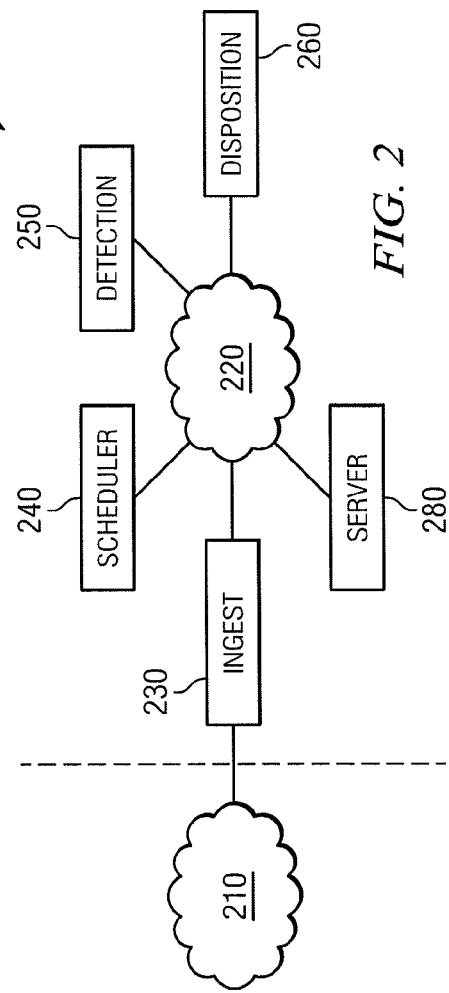
FIG. 2 illustrates one embodiment of a node suitable for implementing one or more portions of particular embodiments.

FIG. 2 illustrates one embodiment of a node 200. In certain embodiments, one or more nodes 102 of FIG. 1 may be substantially similar to node 200. However, the present disclosure contemplates one or more of nodes 102 of FIG. 1 being implemented differently than node 200. As shown in FIG. 2, node 200 includes an ingest block 240, a detection block 250, a disposition block 260, a server 280, and an internal network 220. Internal network 220, in certain embodiments, refers to any interconnecting system capable of transmitting audio, video, signals, data, messages, or any combination of the preceding between blocks 230-280. According to one embodiment, interconnecting system includes a system bus. Node 200 is in communication with an external network 210, which in certain embodiments may be substantially similar to network 106 of FIG. 1. In various embodiments, blocks 220-280 may represent hardware, software, or a combination of the two.

According to one embodiment, the implementation and/or operation of blocks 220-280 may be described generally as follows. Ingest block 230 accesses a file and determines that one or more tests that should be performed on the file in order to determine whether the file is suspected of malware. In response, detection block 250 performs the test(s) that were determined by ingest block 230 in accordance with scheduling performed by scheduler block 240. Disposition block 260 utilizes the results of the tests performed by detection block 250 to determine whether the file(s) should be sent to server block 280 for quarantine purposes while a second analytical stage for the file is processed (e.g., at analysis console 104). Further detail regarding the implementation and/or operation of blocks 220-280 are described below.

Ingest block 230 may be implemented using any suitable combination of hardware, firmware, or software. In certain instances, ingest block 230 may reside on the same hardware that blocks 240-280 reside upon or on different hardware. Ingest block 230 may be operable to extract and cause to be analyzed the files that are accessed by node 200. Ingest block 230 may analyze the file(s) and determine one or more tests that should be performed on the file(s) in order to determine whether the file is suspected of malware. In certain embodiments, ingest block 230 may be configured to determine the type of file that ingest block 230 receives. For example, ingest block 230 may examine an extension associated with the file name to determine the type of the file. As another example, ingest block 230 may examine portions of the file content in order to determine its type. Ingest block 230 may look at characters in a header of a file to determine its type. Such characters may be referred to as magic numbers or magic bits. In this manner, in some embodiments, ingest block 230 may detect the correct type of the file even if the extension of the file's name has been removed or changed. As another example, for certain types of files (e.g., MICROSOFT OFFICE files), ingest block 230 may determine the file type based on both magic number(s) and the file extension, possibly examining the magic number(s) prior to examining the file extension.

In various embodiments, ingest block 230 may be configured to determine whether a file has been previously analyzed for malware. Ingest block 230 may use one or more techniques to determine if a file has been previously analyzed for malware. For example, ingest block 230 may generate one or more hashes of content of the file (such as a checksum, an MD5 hash, and/or a SHA1 hash). These value(s) may be compared to a database containing hash values of previously analyzed files. If the hash value is found in data storage, ingest block 230 may determine that the file has been previously analyzed. If the hash value is not present in data storage, ingest block 230 may determine that the file has not been previously analyzed. In some embodiments, ingest block 230 may use the name of the file and/or its extension, as well as variations on those items, to determine if the file has been previously analyzed.

If it is determined that a file has been analyzed previously, malware detection schemes may not be applied to the file; instead, the results of the previous analysis of the file may be determined using a database that contains results of a previous analysis of the file. If the results indicate that the file is known not to be malware, then the analysis of the file may end. If it is determined that the file was previously determined to be malware, then it may be determined that the file should be quarantined. If it is determined that the file has been previously received and is currently being analyzed (e.g., possibly including review by human analysts), then action may be taken once the outcome of the ongoing analysis is known. In some embodiments, this may allow for more efficient utilization of the resources that perform the malware detection schemes on the files and may reduce the workload of a machine and/or human analyst.

In certain embodiments, ingest block 230 may be used to determine whether a file should undergo malware detection and/or which malware detection schemes should be applied. For example, ingest module 230 may determine that a file received by ingest module 210 is a plain text file. Ingest block 230 may then retrieve one or more policies associated with plain text files. A retrieved policy may indicate that plain text files are not to be analyzed for malware. As a result, the plain text file may be ignored. As another example, ingest block 230 may determine that a file is a document created by the MICROSOFT WORD application. Ingest block 230 may then retrieve one or more policies associated with MICROSOFT WORD documents. Ingest block 230 may examine the retrieved policy or policies and determine that the received file should be analyzed for malware. Ingest block 230 may also examine the retrieved policy or policies and determine the malware detection schemes that should be applied to the MICROSOFT WORD document. Ingest block 230 may then create and store entries in data storage consistent with the determined malware detection schemes.

Scheduler block 240, in various embodiments, may be implemented using software, hardware or a combination of the two. Scheduler Block 240 may reside on the same hardware as blocks 230 and/or 250-280 or it may reside on separate hardware. Scheduler block 240, in some embodiments, may determine the order in which malware detection processes are performed. Scheduler block 240 may assign processes to various computing resources of node 200 using any suitable method. For example, scheduler block 240 may use a first-in-first-out (FIFO) algorithm to assign processes. Processes may also be prioritized. For example, scheduler block 240 may use a FIFO approach to schedule jobs initially, but it may be determined to prioritize one job over another in response to results provided by the detection nodes. Schedule policies may be used by scheduler block 240 to determine how to schedule jobs and how to prioritize jobs. Priorities for jobs, in some embodiments, may also be determined based on the context associated with the file. For example, if the file undergoing analysis was part of an e-mail attachment, it may be prioritized higher than other files.

In some embodiments, policies used by scheduler block 240 may be modified when a new malware detection scheme is added. Information may be entered regarding how to apply the malware detection scheme. For example, such information may be entered using a tabbed interface, a wizard-style interface, or other interfaces for entering information. The information entered may include how jobs should be prioritized, the context associated with the file, which nodes 102 are involved in implementing the malware detection scheme, and/or other items associated with applying a malware detection scheme.

Detection block 250, in various embodiments, may be operable to perform the test(s) that were determined by ingest block 230 in accordance with scheduling performed by scheduler block 240. In certain embodiments, detection block 250 may conform to an interface standard for applying malware detection. Such an interface may include standards for one or more of the following: specifying the file (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes.

In some embodiments, having such an interface may be advantageous because it may allow policies to call for the application of malware detection schemes without having to give precise parameters based on the configuration of the detection node. In this manner, in various embodiments, new detection schemes may be added to the system without needing to recode various parts of the system since the detection node applying the new malware detection scheme would conform to the interface standard. For example, to add a new malware detection scheme, the detection node applying the new malware detection seem may be configured to conform to the interface standard by being configured to receive files for analysis in the same or similar manner as other configuration nodes applying other malware detection schemes. In addition, for example, the configuration node applying the new malware detection scheme may be configured to report the results of applying the new malware detection scheme in the same or similar manner as other configuration nodes applying other malware detection schemes. This, in some embodiments, may be advantageous in that it allows for the system to adapt to new malware detection schemes.

Detection block 250 may be implemented on a variety of types of hardware. For example, detection block 250 may be configured in a blade architecture or on physical hosts. Detection block 250 may also be configured utilizing clusters or other suitable distributed computing architectures. Detection block 250 may utilize virtualization and/or may include virtual machines. Detection block 250 may be used to apply a variety of malware detection schemes to a file (which, in some embodiments, may include one or more URLs). In some embodiments, detection block 250 may be specialized such that node 200 may be configured to apply a type of malware detection scheme. For example, detection block 250 may be configured to apply behavior-based malware detection schemes and/or metadata-based detection schemes when metadata of a file is analyzed. In yet another example, detection block 250 may be configured to apply signature-based detection schemes to files. As another example, detection block 250 may also apply classification-based detection schemes. As described above, detection block 250 may be configured to apply other forms of detection schemes that conform to an interface to facilitate the incorporation of new or different detection schemes.

Disposition block 260, in certain embodiments, may be operable to utilize the results of the tests performed by detection block 250 to determine what should be done with the file(s). In some cases, disposition block 260 may characterize the file as being suspected of malware. In response, node 200 may send information corresponding to the file(s) and/or actual content of the file(s) for further review at analysis console 104. In various embodiments, disposition block 260 may respond to the results of detection block 250 regardless of whether it sends the file(s) to analysis console 104. For example, disposition block 260 may determine that the file(s) should be quarantined and send the file to server block 280 to quarantine the file. In some embodiments, disposition block 260 may also determine that the file(s) are not malware and may perform suitable corresponding actions. For example, disposition block 260 may release for delivery a message to which the analyzed file(s) were attached, in response to the determination by disposition block 260 that the file(s) are not malware.

Server 280 may include, for example, a file server, a domain name server, a proxy server, a web server, a computer workstation, or any other tangible device and associated logic operable to communicate with blocks 230, 240, 250, 260, and/or 280 through network 220. Server 280 may execute with any of the well-known MS-DOS, PC-DOS, OS-2, MAC-OS, WINDOWS™, UNIX, or other appropriate operating systems, including future operating systems. In certain embodiments, server 280 may include one or more of the following in any suitable combination: a processor, data storage, a network interface, input functionality, and output functionality.

Figure 3:
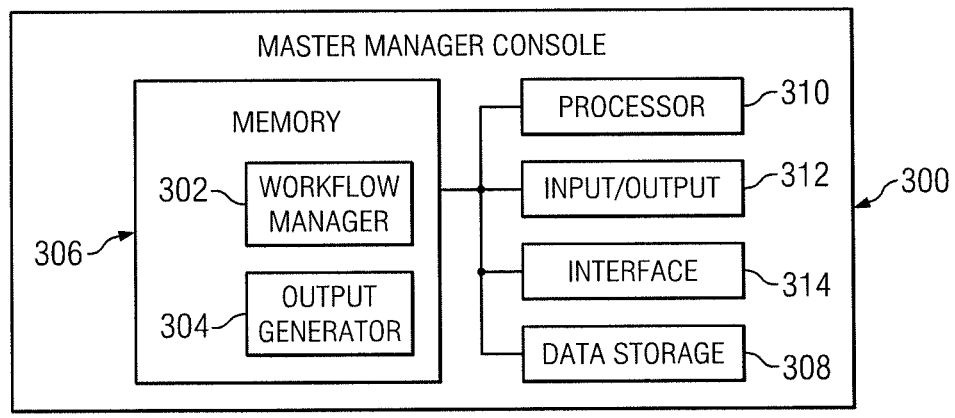
FIG. 3 illustrates one embodiment of a master manager console suitable for implementing one or more portions of particular embodiments.

FIG. 3 illustrates one embodiment of master manager console 300. In certain embodiments, master manager console 300 may be substantially similar to master manager console 130 of FIG. 1. As shown in FIG. 3, master manager console 300 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In some embodiments, workflow manager 302 may determine a workflow. A workflow is an ordered list of tasks related to malware analysis. Execution of a workflow starts with the task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of master manager console 300. The information analyzed may correspond to a file and/or may include actual content of the file.

In certain instances, a file or information corresponding to the file may be presented to a human analyst for review based on a prior characterization of the file. For example, if node 200 characterizes the file as being suspected of malware then a human analyst may review the file to determine if it is in fact malware. As another example, if the file is determined to be malware rather than merely to be suspected malware, a human analyst may review the file in order to learn more about the malware in the file and/or to start an incident response review (e.g., to clean up the file). In such and other scenarios, workflow manager 302 may determine a workflow associated with reviewing the file. In some embodiments, workflow manager 302 may generate a set of tasks to be performed by a human analyst reviewing the file based on a variety of factors. Such factors could include the type of file being reviewed and the characterization of the file by node 200. As another example, if the file is determined to be known malware, then workflows associated with cleaning up the environment(s) the file has been in as well as other incident response workflows (e.g., notifying a user or an administrator) may be determined. Other suitable workflows may be generated based on these or other suitable factors.

In various embodiments, workflow manager 302 may, automatically perform certain tasks to facilitate the review of the file by the human analyst. For example, it may be determined that in order for a file to be properly reviewed by a human analyst, all strings in the file should be extracted. Workflow manager 302 may automate this extraction procedure. Workflow manager 302 may also provide a priority associated with the review of the file. For example, if it is determined that a file has a higher probability of containing malware, then a higher priority may be assigned to the review of the file. Workflow manager 302 may also provide a display that enables the human analyst to review the workflow, the file being analyzed, and/or information pertaining to that file.

Output generator 304, in certain embodiments, may be operable to generate a malware analysis output. In various embodiments, the output may include an identifier of the file or files analyzed. For example, an identifier might include a hash of all or a portion of a file analyzed at master manager console 300. The hash may be at least substantially equivalent to a hash generated by the ingest block 230 of the node 200 requesting the file to be further analyzed for malware. Certain outputs generated by output generator 304 may include an indication of whether the file (or files) analyzed at output generator 304 contain malware.

According to one embodiment, the output generated by output generator 304 may be sent to the manager console 104 requesting the particular analysis performed in generating that output. The receiving manager console 104 may propagate the output to all nodes 102 residing on the same network 110 as the receiving manager console 104. Each one of those nodes 102 may be configured to use the output to determine whether all or a portion of another file it accesses comprises content substantially equivalent to content of a file previously analyzed by the node 102 or another component of system 100. For example, the output may be used to determine whether content of newly accessed file is at least 95% equivalent to content of a previously analyzed file. Although a 95% equivalency value is used in this example, other equivalency thresholds may be used in comparing content of files (e.g., equivalency thresholds of 90%, 98%, 99%, 99.99%, 100%, etc.)

Nodes 102 may each be operable to generate hashes of files they access and determine whether the hashes are equivalent or substantially equivalent to hashes received as outputs from output generator 304. If the hash matches the hash of a file previously determined to contain malware, the node 102 accessing the file may determine that the accessed file contains malware. However, if the hash matches the hash of a file previously determined not to contain malware, node 102 accessing the file may determine that the accessed file does not contain malware.

Memory 306 and data storage 308 may each comprise any number of tangible storage media. Additionally, all or part of memory 306 and/or data storage 308 could reside locally within master manager console 300 or could reside at a location external but accessible to master manager console 300 (e.g., within removable media, and/or at an external database).

Processor 310 may refer, for example, to the one or more tangible devices of master manager console 300 capable of carrying out instructions, such as that of a computer program. In certain embodiments, processor 310 may comprise the primary element or elements executing or realizing various logic-based functions, including, for example, the functions of workflow manager 302 and an output generator 304.

I/O functionality 312 may comprise, for example, any communication method of master manager console 300 (e.g., from an image buffer to a display). In some embodiments, input functionality may comprise, for example, the receiving signals or data by master manager console 300. In other embodiments, output functionality may comprise, for example, the communication of signals or data by analysis console. These terms may also refer to part of an action, such as, for example, to "perform I/O" may involve performing an input and/or output operation. In some cases, one or more communication devices of master manager console 300 may be used to implement both input and output functionality.

Interface 314 may comprise, for example, any tangible device(s) that may be used (e.g., by a person, or by another device or system) to communicate with master manager console 300. For example, keyboards and mice may be considered input interfaces 314 of some analysis consoles 300, while monitors and printers may be considered output interfaces of some analysis consoles 300.

In certain embodiments, the described processing and memory elements (such as memory 306 and processors 310) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, master manager console 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Figure 4:
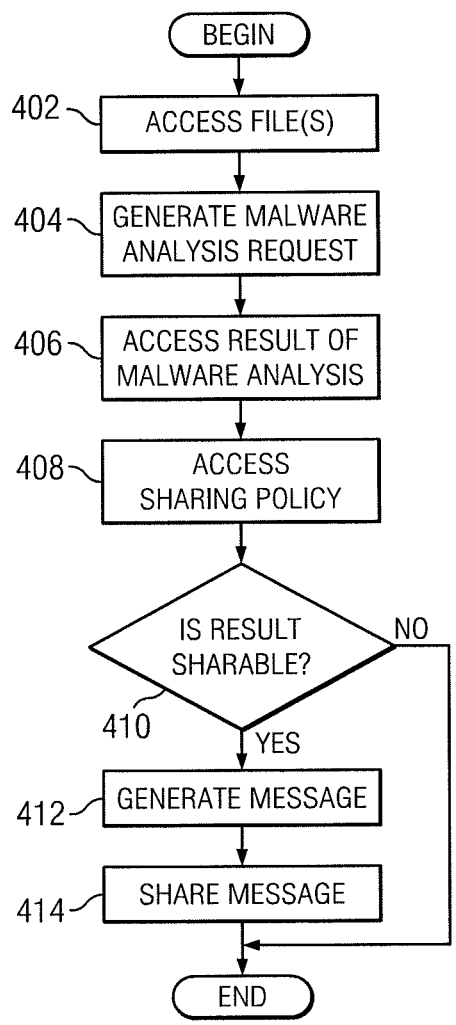
FIG. 4 is a flowchart illustrating one embodiment of processing files in a malware detection system.

FIG. 4 is a flowchart illustrating an example method of distributed malware analysis. In step 402, information is accessed related to a first file determined to satisfy at least one of a plurality of suspected malware conditions. In particular embodiments, the information may include data indicating a result of a preliminary malware analysis performed by a first node 102 on at least a portion of the first file. For example, the information may indicate the suspected malware condition that the first file had been determined to satisfy. If the first file is encrypted, the first file may be decrypted, for example, using a key shared with the first node 102 that had requested that the first file be analyzed for malware. In certain embodiments, the information accessed in step 402 may be included in queue received at first manager console 104 from various nodes 102 requesting malware analysis. In certain embodiments, the information may be accessed by a first manager console 104 of the plurality of manager consoles 104, as described previously.

Certain embodiments may be capable of accessing files in a variety of contexts. For example, system 100 may be used to perform malware analysis in a messaging environment. Suitable messaging environments include, but are not limited to, an e-mail environment, an instant messaging environment, a peer-to-peer messaging environment, a chat environment, or other messaging environments. In a particular example, an email attachment may be accessed in step 402. As another example, files may be accessed in contexts where files are downloaded and/or uploaded. For example, some or all of system 100 may be utilized in File Transfer Protocol (FTP) sessions, Wiki sessions, online message boards (such as forums), or other interactive environments. In other example, files may be accessed in Web browsing context. In such a context, some or all of system 100 may analyze requested Web pages and determine if they are malicious. In a Web browsing context, accessing a "file" may comprise accessing one or more URLs.

In step 404, a request is generated for a determination of whether the first file comprises malware. In certain embodiments, the request may be generated by the first manager console 104 that had accessed information related to the first file. The determination of whether the first file comprises malware may be conducted at a master manager console 104 configured to access requests generated from each of the plurality of manager consoles 104, as described previously. According to one embodiment, the accessed information related to the first file, and/or all or a portion of the first file, may be presented to a human analyst for review at master manager console 104. In particular embodiments, the malware analysis performed in step 404 may include accessing input from the human analyst collected via a human interface.

In step 406, data is accessed that indicates a result of the determination of whether the first file comprises malware. In certain embodiments, the result is outputted by the master manager console 130, as described previously. In certain embodiments, the data indicating the result may include an identifier of the first file analyzed. In certain embodiments, the data may include a parameter usable by the various components of system 100 in identifying a replica of the first file analyzed for malware.

In step 408, a sharing policy is accessed. In certain embodiments, the sharing policy may be associated with the first manager console 104 that had generated a request of whether the first file comprises malware. The sharing policy may indicate what type of information the first manager console 130 is willing to share with other manager consoles 104.

In step 410, a determination is made regarding whether the sharing policy indicates that the result is sharable. For example, the determination may find that the result is sharable with a second manager console 104 of the plurality of manager consoles 104. If the sharing policy indicates that the result is sharable with the second manager console 104, then a message is generated in step 412 and sent to the second manager console 104 in step 414. The message includes the result of the determination of whether the first file comprises malware. In addition, the message may include other types of information including, for example, metadata from detection files and/or end-user analysis. In certain embodiments, the message that is sent may have been encrypted. In particular embodiments, the message may be routed through the second manager console 104 to another component, such as, for example, a node 102 communicatively coupled to the same network as the second manager console. If the sharing policy indicates that the result is not sharable, however, then the result is not shared with the second manager console 104.

Throughout this disclosure, reference to computer-readable storage media may include, as examples and not by way of limitation, any suitable combination of a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or other suitable computer-readable storage media.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented method, comprising:
accessing, by a first manager console of a plurality of manager consoles, information related to a first file determined to satisfy at least one of a plurality of suspected malware conditions, each manager console communicatively coupled to a respective network of a plurality of networks, the information including data from a first malware detection process indicating the at least one suspected malware condition;
generating a request, by the first manager console, for a determination by a master manager console, of whether the first file comprises malware, the master manager console configured to access requests generated from each of the plurality of manager consoles;
accessing data indicating a result of the determination of whether the first file comprises malware, the result outputted by the master manager console;
accessing, by the first manager console, a sharing policy associated with the first manager console, the sharing policy including an indication of what information the first manager console may share with other manager consoles of the plurality of manager consoles in the plurality of networks;
determining that the sharing policy indicates that the result is sharable with a second manager console of the plurality of manager consoles, the second manager console communicatively coupled to a second network of the plurality of networks;
generating, by the first manager console, in response to the determination that the sharing policy indicates that the result is sharable with the second manager console, a message to be sent from the first manager console to the second manager console, the message comprising the result of the determination of whether the first file comprises malware;
accessing, by the first manager console of the plurality of manager consoles, information related to a second file determined to satisfy at least one of the plurality of suspected malware conditions, the information including data from the first malware detection process indicating the at least one suspected malware condition;
generating a second request, by the first manager console, for a second determination by the master manager console, of whether the second file comprises malware;
accessing data indicating a second result of the second determination of whether the second file comprises malware, the second result outputted by the master manager console;
accessing, by the first manager console, the sharing policy associated with the first manager console;
determining that the sharing policy indicates that the result is not sharable with the second manager console of the plurality of manager consoles; and
refraining from sharing the second result, by the first manager console, in response to the determination that the sharing policy indicates that the result is not sharable with the second manager console;
wherein each manager console of the plurality of manager consoles is remote from each other management console.

2. The method of claim 1, wherein the information related to the first file and the data from the first malware detection process are generated by a detection node coupled to the first manager console.

3. The method of claim 1, wherein each respective network of the plurality of networks is associated with a respective organization of a plurality of organizations.

4. The method of claim 1, wherein the first manager console is remote from the master manager console.

5. The method of claim 1, wherein each manager console is configured as a firewall for the respective network of the plurality of networks to which the manager console is communicatively coupled.

6. The method of claim 1, further comprising pushing a message representing the result to at least a subset of malware analysis nodes communicatively coupled to the master manager console through the first manager console, the message indicating that the first file does not comprise malware.

7. The method of claim 1, further comprising encrypting the message and routing the encrypted message through the master manager console.

8. A computer-implemented method, comprising:
accessing, by a master manager console, a request for a determination of whether a first file suspected of malware comprises malware, the master manager console configured to access requests generated from each of a plurality of manager consoles;
generating, by the master manager console in response to the determination, an output indicating a result of the determination of whether the first file comprises malware;
accessing an address of a first manager console of a plurality of manager consoles, each of the plurality of manager consoles residing at a respective network of a plurality of networks, the first manager console having generated the request for the determination of whether the first file comprises malware;
accessing, by the master manager console, a sharing policy associated with the first manager console, the sharing policy including an indication of what information the first manager console may share with other manager consoles of the plurality of manager consoles in the plurality of networks;
determining that the sharing policy indicates that the result is sharable with a second manager console of the plurality of manager consoles;
generating, in response to the determination that the sharing policy indicates that the result is sharable with the second manager console, a message to be sent to the second manager console, the message comprising the result of the determination of whether the first file comprises malware;
accessing, by the master manager console, a second request for a second determination of whether a second file suspected of malware comprises malware;
generating, by the master manager console in response to the second determination, a second output indicating a second result of the second determination of whether the second file comprises malware;
accessing, by the master manager console, the sharing policy associated with the first manager console;
determining that the sharing policy indicates that the result is not sharable with a second manager console of the plurality of manager consoles; and
refraining from sharing the second output, in response to the determination that the sharing policy indicates that the second result is not sharable with the second manager console;
wherein each manager console of the plurality of manager consoles is remote from each other management console.

9. The method of claim 8, wherein each respective network of the plurality of networks is inaccessible to each other respective network of the plurality of networks.

10. The method of claim 9, wherein each respective network of the plurality of networks is associated with a respective organization of a plurality of organizations.

11. The method of claim 9, wherein each manager console is configured as a firewall for the respective network of the plurality of networks to which the manager console is communicatively coupled.

12. The method of claim 8 further comprising determining a fee associated with the determination of whether the first file comprises malware.

13. The method of claim 12, further comprising determining an apportionment of the fee among each of the first and second manager consoles.

14. The method of claim 8, wherein the first manager console is remote from the master manager console.

15. The method of claim 8, further comprising pushing a message representing the result to at least a subset of malware analysis nodes communicatively coupled to the first manager console, the message indicating that the first file does not comprise malware.

16. The method of claim 8, further comprising encrypting the message and routing the encrypted message through the master manager console.

17. Non-transitory computer-readable media encoded with software, the software operable, when executed by a computing system, to perform operations comprising:
accessing, by a master manager console, a request for a determination of whether a first file suspected of malware comprises malware, the master manager console configured to access requests generated from each of a plurality of manager consoles;
generating, by the master manager console in response to the determination, an output indicating a result of the determination of whether the first file comprises malware;
accessing an address of a first manager console of a plurality of manager consoles, each of the plurality of manager consoles residing at a respective network of a plurality of networks, the first manager console having generated the request for the determination of whether the first file suspected of malware comprises malware;
accessing a sharing policy associated with the first manager console, the sharing policy including an indication of what information the first manager console shares with other manager consoles of the plurality of manager consoles in the plurality of networks;
determining that the sharing policy indicates that the result is sharable with a second manager console of the plurality of manager consoles;
generating, in response to the determination that the sharing policy indicates that the result is sharable with the second manager console, a message to be sent to the second manager console, the message comprising the result of the determination of whether the first file comprises malware;
accessing, by the master manager console, a second request for a second determination of whether a second file suspected of malware comprises malware;
generating, by the master manager console in response to the second determination, a second output indicating a second result of the second determination of whether the second file comprises malware;
accessing the sharing policy associated with the first manager console;
determining that the sharing policy indicates that the second result is not sharable with the second manager console of the plurality of manager consoles; and refraining from sharing the second output, in response to the determination that the sharing policy indicates that the result is not sharable with the second manager console.

18. The computer-readable media of claim 17, wherein the software is further operable, when executed by the computing system, to determine a fee associated with the determination of whether the first file comprises malware.

19. A computer-implemented method, comprising:

generating, by a detection node, information related to a first file determined to satisfy at least one of a plurality of suspected malware conditions by a first malware detection process, the information comprising data indicating the at least one of the plurality of suspected malware conditions;

accessing, by a first manager console of a plurality of manager consoles, the information related to the first file, each manager console communicatively coupled to a respective network of a plurality of networks and remote from each other manager console;

generating a request, by the first manager console, for a determination by a master manager console, of whether the first file comprises malware, the master manager console configured to access requests generated from each of the plurality of manager consoles;

accessing data indicating a result of the determination of whether the first file comprises malware, the result outputted by the master manager console;

accessing, by the first manager console, a sharing policy associated with the first manager console, the sharing policy including an indication of what information the first manager console may share with other manager consoles of the plurality of manager consoles in the plurality of networks;

determining that the sharing policy indicates that the result is sharable with a second manager console of the plurality of manager consoles, the second manager console communicatively coupled to a second network of the plurality of networks;

generating a message to be sent from the first manager console to the second manager console, in response to the determination that the sharing policy indicates that the result is sharable with the second manager console, the message comprising the result of the determination of whether the first file comprises malware;

pushing the message representing the result to at least a subset of malware analysis nodes communicatively coupled to the master manager console through the first manager console, the message indicating that the first file does not comprise malware;

generating, by the detection node, information related to a second file determined to satisfy at least one of the plurality of suspected malware conditions by the first malware detection process;

accessing, by the first manager console of a plurality of manager consoles, the information related to the second file;

generating a second request, by the first manager console, for a second determination by the master manager console, of whether the second file comprises malware;

accessing data indicating a second result of the second determination of whether the second file comprises malware, the result outputted by the master manager console;

accessing, by the first manager console, the sharing policy associated with the first manager console;

determining that the sharing policy indicates that the second result is not sharable with the second manager console of the plurality of manager consoles; and refraining from sharing the second result, in response to the determination that the sharing policy indicates that the second result is not sharable with the second manager console.

20. The method of claim 19, further comprising:

encrypting the message and routing the encrypted message through the master manager console;

wherein each respective network of the plurality of networks is associated with a respective organization of a plurality of organizations, and each manager console of the plurality of manager consoles is remote from the master manager console.

* * * * *